(12) United States Patent
Ran et al.

(10) Patent No.: US 10,460,298 B1
(45) Date of Patent: Oct. 29, 2019

(54) DETECTING AND CORRECTING ACCOUNT SWAP IN BANK FEED AGGREGATION SYSTEM

(71) Applicant: Intuit Inc., Mountain View, CA (US)

(72) Inventors: Alexander S. Ran, Palo Alto, CA (US); Christopher Lesner, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 578 days.

(21) Appl. No.: 15/217,056

(22) Filed: Jul. 22, 2016

(51) Int. Cl.
*G06Q 40/00* (2012.01)
*G06Q 20/10* (2012.01)
*G06Q 20/22* (2012.01)
*G06Q 20/12* (2012.01)

(52) U.S. Cl.
CPC ............. *G06Q 20/10* (2013.01); *G06Q 20/12* (2013.01); *G06Q 20/227* (2013.01)

(58) Field of Classification Search
CPC .... G07F 19/20; G07F 19/201; G06Q 20/1085
USPC ....................................................... 235/379
See application file for complete search history.

(56) References Cited

U.S. PATENT DOCUMENTS

| | | |
|---|---|---|
| 7,283,999 B1 | 10/2007 | Ramesh et al. |
| 7,428,636 B1 | 9/2008 | Waldspurger et al. |
| 7,457,950 B1 | 11/2008 | Brickell et al. |
| 7,702,683 B1 | 4/2010 | Kirshenbaum |
| 7,815,106 B1 | 10/2010 | McConnell |
| 7,865,829 B1 | 1/2011 | Goldfield et al. |
| 7,890,754 B2 | 2/2011 | Waldspurger et al. |
| 8,024,660 B1 | 9/2011 | Quinn et al. |
| 8,037,145 B2 | 10/2011 | Bunker et al. |
| 8,046,298 B1 | 10/2011 | Voth et al. |
| 8,321,319 B1 | 11/2012 | Grossblatt et al. |
| 8,374,986 B2 | 2/2013 | Indeck et al. |
| 8,494,929 B1 | 7/2013 | Borgen et al. |
| 8,544,726 B1 | 10/2013 | Hahn |

(Continued)

FOREIGN PATENT DOCUMENTS

| | | |
|---|---|---|
| JP | 5850592 | 12/2015 |
| WO | WO 2014/074075 | 5/2014 |

OTHER PUBLICATIONS

Hull, et al., "Paper Based Augmented Reality;" Artificial Reality and Telexistence, 17th International Conference, pp. 205-209; IEEE, 2007.

*Primary Examiner* — Ahshik Kim
(74) *Attorney, Agent, or Firm* — Hawley Troxell Ennis & Hawley LLP; Philip McKay

(57) ABSTRACT

A method and system detects and addresses financial account swaps in a financial management system. The method and system include obtaining financial transaction data related to financial transactions associated with a plurality of financial accounts of the user. The method and system include detecting, for each financial account, a change point in a characteristic distribution of the financial transactions of the financial account. The method and system include, if two or more of the change points correlate with each other and time, swapping the financial transactions between the two or more financial accounts until the change points disappear and determining that an account swap occurred in the financial data collection feeds associated with the financial accounts. The method and system include adjusting financial data collection feeds to repair the account swaps.

27 Claims, 3 Drawing Sheets

(56) References Cited

U.S. PATENT DOCUMENTS

| | | |
|---|---|---|
| 8,571,919 B2 | 10/2013 | Rane et al. |
| 8,655,862 B1 | 2/2014 | Riley et al. |
| 8,688,557 B2 | 4/2014 | Rose et al. |
| 8,719,120 B1 | 5/2014 | McVickar et al. |
| 8,949,371 B1 | 2/2015 | Shrowty |
| 8,977,626 B2 | 3/2015 | Hess |
| 9,047,243 B2 | 6/2015 | Taylor et al. |
| 9,305,056 B1 | 4/2016 | Gupta et al. |
| 9,348,857 B2 | 5/2016 | Glover |
| 10,229,100 B1 | 3/2019 | Lesner et al. |
| 2003/0078882 A1 | 4/2003 | Sukeda et al. |
| 2004/0225509 A1 | 11/2004 | Andre |
| 2005/0091151 A1 | 4/2005 | Coleman et al. |
| 2005/0120004 A1 | 6/2005 | Stata et al. |
| 2005/0268217 A1 | 12/2005 | Garrison |
| 2006/0200754 A1 | 9/2006 | Kablesh et al. |
| 2006/0294311 A1 | 12/2006 | Fu et al. |
| 2008/0027787 A1 | 1/2008 | Malsbenden et al. |
| 2008/0077488 A1 | 3/2008 | Main et al. |
| 2008/0086403 A1 | 4/2008 | Dilip et al. |
| 2008/0320316 A1 | 12/2008 | Waldspurger et al. |
| 2009/0144239 A1 | 6/2009 | Bevis et al. |
| 2009/0183159 A1 | 7/2009 | Michael et al. |
| 2010/0250338 A1 | 9/2010 | Banerjee et al. |
| 2010/0306032 A1 | 12/2010 | Jolley |
| 2011/0022523 A1 | 1/2011 | Ruan |
| 2011/0087606 A1 | 4/2011 | Hammond et al. |
| 2011/0178841 A1 | 7/2011 | Rane et al. |
| 2011/0178842 A1 | 7/2011 | Rane et al. |
| 2011/0178844 A1 | 7/2011 | Rane et al. |
| 2011/0178845 A1 | 7/2011 | Rane et al. |
| 2011/0178847 A1 | 7/2011 | Rane et al. |
| 2011/0178848 A1 | 7/2011 | Rane et al. |
| 2011/0178849 A1 | 7/2011 | Rane et al. |
| 2011/0208588 A1 | 8/2011 | Joa et al. |
| 2011/0246268 A1 | 10/2011 | Satyavolu et al. |
| 2011/0264497 A1 | 10/2011 | Clyne |
| 2012/0004968 A1 | 1/2012 | Satyavolu et al. |
| 2012/0053987 A1 | 3/2012 | Satyavolu et al. |
| 2012/0054049 A1 | 3/2012 | Hayes |
| 2012/0078766 A1 | 3/2012 | Rose et al. |
| 2012/0109723 A1 | 5/2012 | Crooks et al. |
| 2012/0109749 A1 | 5/2012 | Subramanian et al. |
| 2013/0006829 A1* | 1/2013 | Fairweather ........... G06Q 40/04 705/37 |
| 2013/0133048 A1 | 5/2013 | Wyn-Harris |
| 2013/0159449 A1 | 6/2013 | Taylor et al. |
| 2013/0232042 A1 | 9/2013 | Simpson et al. |
| 2013/0272523 A1 | 10/2013 | McCorkindale et al. |
| 2013/0325548 A1 | 12/2013 | Kulkarni et al. |
| 2013/0325680 A1 | 12/2013 | Satyavolu et al. |
| 2013/0325681 A1 | 12/2013 | Somashekar et al. |
| 2013/0346274 A1* | 12/2013 | Ferdinand ............. G06Q 40/04 705/37 |
| 2014/0041047 A1 | 2/2014 | Jaye et al. |
| 2014/0180826 A1 | 6/2014 | Boal |
| 2014/0188756 A1 | 7/2014 | Ponnavaikko et al. |
| 2014/0195395 A1 | 7/2014 | Bhakta et al. |
| 2014/0195398 A1 | 7/2014 | Rose et al. |
| 2014/0222530 A1 | 8/2014 | Wegner et al. |
| 2014/0230053 A1 | 8/2014 | Mote et al. |
| 2014/0244457 A1 | 8/2014 | Howell et al. |
| 2015/0142624 A1 | 5/2015 | Buttonow et al. |
| 2015/0178856 A1 | 6/2015 | Flores |
| 2015/0193790 A1 | 7/2015 | Weinberger et al. |
| 2015/0205777 A1 | 7/2015 | Campanelli et al. |
| 2015/0206109 A1 | 7/2015 | Caldwell et al. |
| 2015/0324410 A1 | 11/2015 | Glover |
| 2015/0363704 A1 | 12/2015 | Yong et al. |
| 2015/0379430 A1 | 12/2015 | Dirac et al. |
| 2016/0063645 A1 | 3/2016 | Houseworth et al. |
| 2016/0217119 A1 | 7/2016 | Dakin et al. |
| 2017/0053012 A1 | 2/2017 | Levy et al. |
| 2017/0193045 A1 | 7/2017 | Young et al. |
| 2017/0316506 A1 | 11/2017 | Lesner et al. |
| 2018/0032973 A1* | 2/2018 | Sharma ................. G06Q 20/04 |
| 2018/0211330 A1* | 7/2018 | Ran ..................... G06F 16/2291 |

* cited by examiner

US 10,460,298 B1

DETECTING AND CORRECTING ACCOUNT SWAP IN BANK FEED AGGREGATION SYSTEM

BACKGROUND

Millions of people around the world use electronic financial management systems to help manage their finances. Such financial management systems gather data related to financial transactions of the users. The users can monitor many of their financial accounts and other financial matters from a single financial management system. Such financial management systems can help users save time by eliminating the need to check several different financial accounts in order to manage their finances. However, many users can still encounter difficulties when using traditional financial management systems.

For instance, financial management systems occasionally erroneously swap data collection feeds for multiple financial accounts. For example, a bank may change the HTML order of user accounts in the user's banking portal webpage. While in the past the checking account appeared before the savings account in the list of users accounts, after an update to the bank's website the savings account will appear first and the checking account will appear second. In such a case the financial system is likely to import the transactions from the savings account into the checking account and vice versa.

These failures can have tremendous adverse impact on users. Users may make financial decisions based on erroneous data presented to them by their financial management system. A user may make purchases believing she has more money in her checking account than she truly has. A user may buy or sell stocks based on faulty information. This can potentially ruin a user's financial situation and have life-long consequences. Not only does this adversely affect the users, but to assist users with these situations financial management systems may need to devote large amount of human and computer resources to resolving these issues. Additionally, users may feel that their financial management system did them more harm than good and may decide to abandon the financial management system.

What is needed is a method and system that detects and corrects accounts swaps in a financial system.

SUMMARY

Embodiments of the present disclosure address some of the shortcomings associated with traditional financial management systems by providing methods and systems for detecting and addressing accounts swaps in financial data collection feeds. In particular, embodiments of the present disclosure analyze each financial account to detect whether a change has occurred in a characteristic distribution of financial transactions in the financial account. If two or more accounts have undergone a change at approximately the same time, then it is possible that an account swap has occurred. Embodiments of the present disclosure then swap between the accounts the series of transactions that occurred after the change and again analyze the financial accounts. If there is no change detected in the distribution over time, then embodiments of the present disclosure can determine that an account swap had occurred. Embodiments of the present disclosure then correct the data collection feeds to assign financial transactions to the correct financial accounts. In this way, embodiments of the present disclosure can dynamically detect and correct account swaps in a financial management system.

In one embodiment, a financial management system obtains financial transaction data related to financial transactions in a plurality of financial accounts of a user. For each financial account, the financial management system analyzes financial transaction data to determine a characteristic distribution of the financial transactions over time. The financial management system determines, for each account, whether there has been a change in the characteristic distribution of the financial transactions over time. The financial management system identifies, for each financial account that has undergone a distinct change in the characteristic distribution of the financial transactions over time, a change point corresponding to a time after which the characteristic distribution of the financial transactions changed.

In one embodiment, if two or more of the financial accounts have change points that occurred substantially simultaneously, then the financial management system checks to see if the change points are due to erroneous financial account swap by which financial transactions from one financial account are erroneously associated with another financial account. The financial management system accomplishes this by generating adjusted financial transaction data that swaps between financial accounts those transactions that happened after the change point. The financial management system then analyzes the adjusted financial transaction data to determine if the change points are still present in the accounts. If, for two accounts, the change point no longer exists after swapping the post-change point financial transactions, then the financial management system determines that the two financial accounts had become swapped with each other in one or more data collection feeds by which the financial management system obtains the financial transaction data. The financial management system then adjusts the one or more data collection feeds associated with the two financial accounts.

In one embodiment, when more than two financial accounts have change points that occurred around the same time, then the financial management system can swap the post-change point financial transactions between all of the accounts in successive iterations until the change points for all the financial accounts are gone. In this way, the financial management system can accurately detect in what way the accounts had become erroneously swapped and can take corrective action.

In one embodiment, the financial management system includes a data acquisition module, an analytics module, and a script engine. The script engine includes script data related to one or more data collection scripts which, when executed, cause the data acquisition module to gather the financial transaction data. The data acquisition module gathers the financial transaction data by logging into the website of a financial institution on behalf of the user. The data acquisition module obtains financial transaction data for each financial account of the user associated with the financial institution. The analytics module analyzes the financial transaction data according to one or more algorithms to generate a characteristic distribution of each financial account. The analytics module detects change points in the characteristic distributions of the financial accounts. If the change points from two or more of the financial accounts coincide in time, then the analytics module generates adjusted financial transaction data by swapping the series of post-change point financial transactions between the financial accounts. The analytics module then analyzes the adjusted financial transaction data with the one or more algorithms to generate new characteristic distributions for each financial account. The analytics module determines whether the change points are still present. If the change points are not present, then the analytics module determines that an account swap had occurred. The script engine then updates the script data to correct the account swap.

Embodiments of the present disclosure address some of the shortcomings associated with traditional financial management systems that do not adequately detect and address accounts swaps in the financial management system. A financial management system in accordance with one or more embodiments provides confidence to a user by quickly detecting and addressing accounts swaps in the data collection feeds. The various embodiments of the disclosure can be implemented to improve the technical fields of user experience, services marketing, data collection, and data processing. Therefore, the various described embodiments of the disclosure and their associated benefits amount to significantly more than an abstract idea. In particular, by detecting and addressing account swaps in a financial management system, users can save money and time and can better manage their finances.

In one embodiment, the financial management system receives account data from the user. The account data includes data related to the financial accounts and enables the financial management system to log into the website of a financial institution that hosts the financial accounts. In one embodiment, the account data includes login credentials including one or more of a password, a username, an identification number, a birthday, a Social Security number, answers to security questions, or any other type of data that can enable the financial management system to log into the financial accounts of the user.

Using the disclosed embodiments of a method and system for detecting and addressing accounts swaps in a financial management system, a method and system for detecting and addressing accounts swaps in a financial management system more accurately is provided. Therefore, the disclosed embodiments provide a technical solution to the long standing technical problem of providing reliable and secure financial management services for users of a financial management system.

In addition, the disclosed embodiments of a method and system for detecting and addressing accounts swaps in a financial management system are also capable of dynamically adapting to the needs of users of a financial management system. Consequently, the disclosed embodiments of a method and system for detecting and addressing accounts swaps in a financial management system also provide a technical solution to the long standing technical problem of static and inflexible financial management systems.

The result is a much more accurate, adaptable, and robust, method and system for detecting and addressing account swaps in a financial management system and thereby serves to bolster confidence in electronic financial management systems. This, in turn, results in: less human and processor resources being dedicated to analyzing electronic financial transactions because more accurate and efficient analysis methods can be implemented, i.e., fewer processing and memory storage assets; less memory and storage bandwidth being dedicated to buffering and storing financial transaction data; less communication bandwidth being utilized to transmit financial transaction data for data for analysis.

The disclosed method and system for detecting and addressing account swaps in a financial management system does not encompass, embody, or preclude other forms of innovation in the area of electronic financial management. In addition, the disclosed method and system for detecting and addressing accounts swaps in a financial management system is not related to any fundamental economic practice, fundamental data processing practice, mental steps, or pen and paper based solutions, and is, in fact, directed to providing solutions to new and existing problems associated with electronic financial management systems. Consequently, the disclosed method and system for detecting and addressing accounts swaps in a financial management system, does not encompass, and is not merely, an abstract idea or concept.

Figure 1:
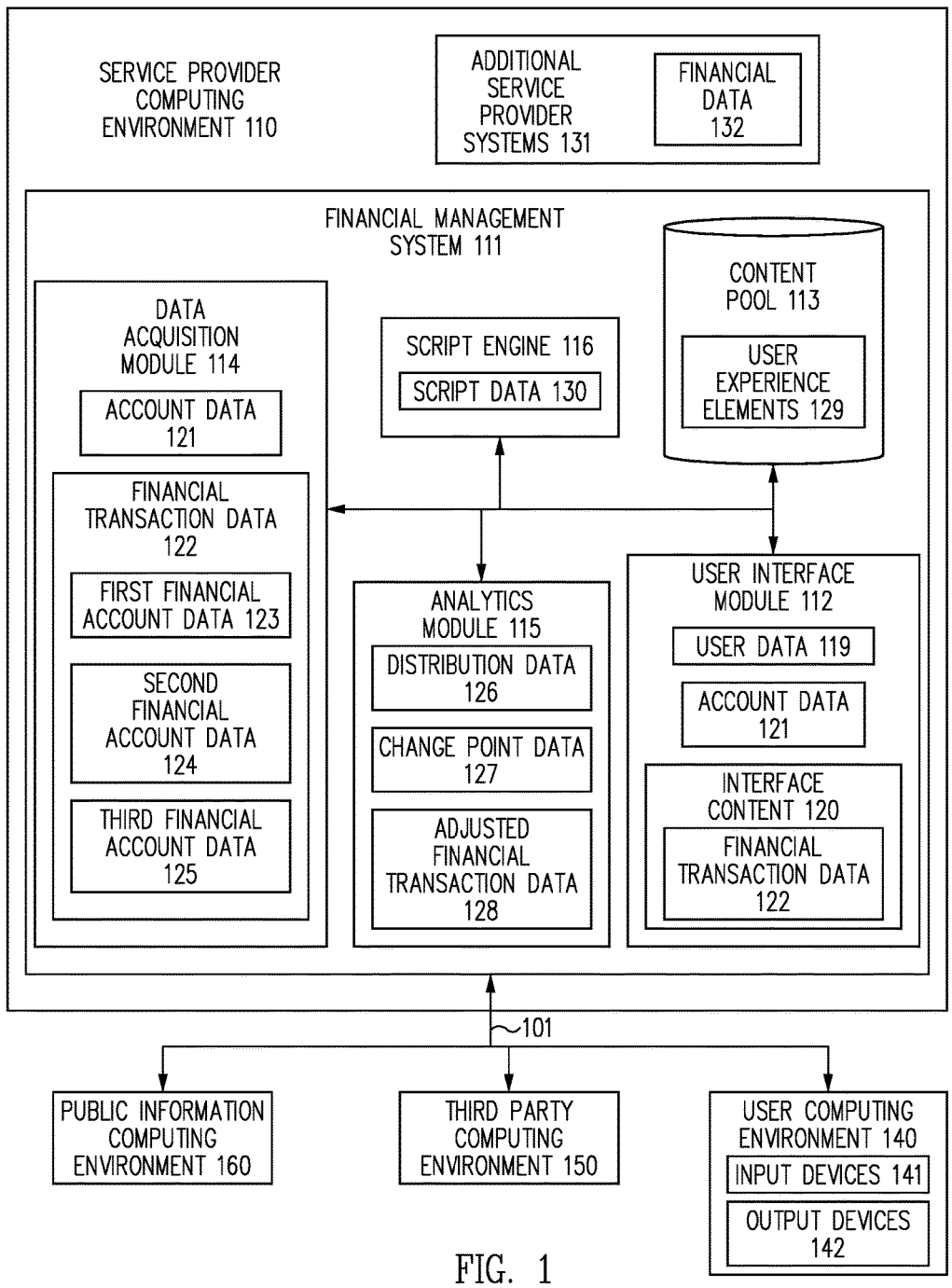
FIG. 1 is a block diagram of software architecture for detecting and addressing accounts swaps in a financial management system, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed financial management system determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

Hardware Architecture

FIG. 1 illustrates a block diagram of a production environment 100 for detecting and addressing accounts swaps in a financial management system, according to one embodiment. Embodiments of the present disclosure provide methods and systems for detecting and addressing accounts swaps in a financial management system, according to one embodiment. Each financial account is represented by a time series of financial transactions and has a characteristic distribution of transactions over time. Embodiments of the present disclosure analyze the collected financial transactions of each financial account to detect whether a change has occurred in the characteristic distribution of the financial transactions for each account. If a change in the distribution has occurred, embodiments of the present disclosure identify, for each financial account, a change point corresponding to the time at which the characteristic distribution of financial transactions has changed. If two financial accounts have experienced a change point at approximately the same time, then it is possible that the data collection feeds for those two financial accounts were erroneously swapped such that financial transactions that occurred in a first of the two financial accounts were assigned to the second financial account, and vice versa. Embodiments of the present disclosure experimentally adjust the financial transaction data by swapping financial transactions that occurred after the change point between the two financial accounts and then analyze the distribution of financial transactions in the adjusted financial transaction data to determine if the change point still exists in both accounts. If the change point disappears in the adjusted financial transaction data for both accounts, then embodiments of the present disclosure determine that the data collection feeds for those two accounts were erroneously swapped at the time that the change point occurred. Embodiments of the present disclosure then adjust the data collection feeds so that the financial transactions are assigned to the correct financial account. Furthermore, if more than two financial accounts experience change points at the same time, embodiments of the present disclosure can iteratively swap post-change point financial transactions between the financial accounts and analyze the distribution until the change points for all accounts are removed. By detecting account swaps and taking corrective steps, the reliability of the financial management system is increased.

In addition, the disclosed method and system for detecting and addressing accounts swaps in a financial management system provides for significant improvements to the technical fields of electronic financial transaction data processing, data management, and user experience.

In addition, as discussed above, the disclosed method and system for detecting and addressing accounts swaps in a financial management system provide for the processing and storing of smaller amounts of data, i.e., more efficiently acquire and analyze financial data; thereby eliminating unnecessary data analysis and storage. Consequently, using the disclosed method and system for detecting and addressing accounts swaps in a financial management system results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for detecting and addressing accounts swaps in a financial management system.

The production environment 100 includes a service provider computing environment 110, user computing environments 140, third party computing environments 150, and public information computing environments 160, for detecting and addressing accounts swaps in a financial management system, according to one embodiment. The computing environments 110, 140, 150, and 160 are communicatively coupled to each other with one or more communication channels 101, according to one embodiment.

The service provider computing environment 110 represents one or more computing systems such as a server, a computing cabinet, and/or distribution center that is configured to receive, execute, and host one or more systems (e.g., applications) for access by one or more users, for detecting and addressing accounts swaps in a financial management system, according to one embodiment. The service provider computing environment 110 represents a traditional data center computing environment, a virtual asset computing environment (e.g., a cloud computing environment), or a hybrid between a traditional data center computing environment and a virtual asset computing environment, according to one embodiment.

The service provider computing environment 110 includes a financial management system 111, which is configured to provide financial management services to a user.

According to one embodiment, the financial management system 111 can be a system that manages one or more of banking, investments, loans, credit cards, real estate investments, retirement planning, bill pay, and budgeting. The financial management system 111 can be a tax return preparation system or other type of financial management system. The financial management system 111 can be a standalone system that provides financial management services to users. Alternatively, the financial management system 111 can be integrated into other software or service products provided by a service provider.

The financial management system 111 collects user financial transaction data related to financial transactions in a plurality of financial accounts of a user. For each financial account, the financial management system 111 analyzes financial transaction data related to that account and determines. The financial management system 111 detects for each financial account, whether there has been a change in a characteristic distribution of the financial transactions over time. The financial management system 111 identifies, for each financial account that has undergone a distinct change in the characteristic distribution of the financial transactions over time, a change point to the corresponding to a time after which the characteristic distribution of the financial transactions changed. If two or more of the financial accounts have change points that occurred around the same time as each other, then the financial management system 111 checks to see if the change points are due to erroneous financial account swap by which financial transactions from one financial account are erroneously assigned to another financial account. The financial management system 111 accomplishes this by generating adjusted financial transaction data that swaps between financial accounts those transactions that happened after the change point. The financial management system 111 then analyzes the adjusted financial transaction data to determine if the change points are still present in the accounts. If, for two accounts, the change points no longer exist after swapping the post-change point financial transactions, then the financial management system 111 determines that the two financial accounts had become swapped with each other in one or more data collection feeds. The financial management system 111 then adjusts the one or more data collection feeds associated with the two financial accounts. When more than two financial accounts have change points that occurred around the same time, then the financial management system 111 can swap the post-change point financial transactions between all of the accounts iteratively until the change points for all the financial accounts are gone. The financial management system 111 includes various components, databases, engines, modules, and/or data to support detecting and correcting account swaps in a financial management system.

The financial management system 111 includes a user interface module 112, a content pool 113, a data acquisition module 114, an analytics module 115, and a script engine 116, according to one embodiment.

The user computing environments 140 can each include input devices 141 and output devices 142 for communicating with users, according one embodiment. The input devices 141 include, but are not limited to, keyboards, mice, microphones, touchpads, touchscreens, digital pens, and the like. The output devices 142 include, but are not limited to, speakers, monitors, touchscreens, and the like. The output devices 142 can display financial transaction data 122.

Returning to the financial management system 111, the user interface module 112 is configured to receive user data 119 and account data 121 from the user, according to one embodiment. The user data 119 includes information, such as, but not limited to the first and last name of the user, the address of the user, usernames of users, identification numbers of the user, the passwords of the user, and other data used by the financial management system 111 to generate and maintain a user account of the user. The user interface module is configured to provide interface content 120 including financial transaction data 122. The interface content 120 can also include user experience elements 129 selected from the content pool 113.

In one embodiment, the account data 121 data provided by the user enables the financial management system 111 to acquire information related to financial transactions of the user. The account data 121 can include data that allows the financial management system 111 to gain access to credit card accounts, bank accounts, retirement fund accounts, payroll accounts, investment accounts, loan accounts, student loan data, property ownership data, tax data, budgeting data, rent data, investments data, employment data, or other types of financial accounts or financial data. Thus, the account data 121 can include login credentials and personal identification data for various websites of third-party financial institutions. The account data 121 can include usernames, passwords, bank account numbers, routing numbers, credit card numbers, answers to security questions, identification numbers, government identification numbers, birth dates, addresses, or other types of verification credentials that allow the financial management system 111 to gain access to online services of third-party financial institutions.

The data acquisition module 114 is configured to use the account data 121 to acquire financial transaction data 122 related to financial transactions of the user. The financial transaction data 122 can include first financial account data 123 related to financial transactions in a first financial account of the user, second financial account data 124 related to financial transactions in a second financial account of the user, and third financial account data 125 related to financial transactions in a third financial account of the user. The data acquisition module 114 uses the account data 121 to log into the online services of third-party financial institutions in order to retrieve financial transaction data related to the financial transactions of users of the financial management system 111. For example, the financial transaction data 122 can include bank account deposits, bank account withdrawals, credit card transactions, credit card balances, credit card payment transactions, online payment service transactions such as PayPal transactions or other online payment service transactions, loan payment transactions, investment account transactions, retirement account transactions, mortgage payment transactions, rent payment transactions, bill pay transactions, budgeting information, financial goal information, or any other types of financial transactions. The data acquisition module 114 is configured to gather the financial transaction data from third-party computing environments 150 related to financial institutions with which one or more users of the financial management system 111 have a relationship.

In one embodiment, the data acquisition module 114 can also supply or supplement the financial transaction data 122 by gathering financial transaction data from other sources including the public information computing environment 160, the additional service provider systems 131, data provided by the user, data collected from user devices or accounts of the financial management system 111, social media accounts, and/or various other sources to merge with or supplement financial transaction data 122, according to one embodiment. The data acquisition module 114 can gather additional data including historical tax related data and third party data. For example, the data acquisition module 114 is configured to communicate with additional service provider systems 131, e.g., a tax return preparation system, a payroll management system, or other financial management system, to access financial data 132, according to one embodiment. The data acquisition module 114 imports relevant portions of the financial data 132 into the financial management system 111 and, for example, saves local copies into one or more databases, according to one embodiment.

In one embodiment, the additional service provider systems 131 include a personal financial management system, and the data acquisition module 114 is configured to acquire financial data 132 for use by the financial management system 111 in providing financial management services to the user, according to one embodiment. Because the services provider provides both the financial management system 111 and, for example, the additional service provider systems 131, the service provider computing environment 110 can be configured to share financial information between the various systems. By interfacing with the additional service provider systems 131, the data acquisition module 114 can supply or supplement the financial transaction data 122 from the financial data 132. The financial data 132 can include income data, investment data, property ownership data, retirement account data, age data, data regarding additional sources of income, marital status, number and ages of children or other dependents, geographic location, and other data that indicates personal and financial characteristics of users of other financial systems, according to one embodiment.

According to one embodiment, the data acquisition module 114 can obtain some or all of the financial transaction data from one or more common databases of the financial management system 111. The common databases can include one or more databases in which user data 119, account data 121, financial transaction data 122, and/or historical financial or tax related data is stored. The common databases can also store other data that can supplement the user data 119, the account data 121, and the financial transaction data 122 acquired by the data acquisition module 114.

The data acquisition module 114 is configured to acquire data from third parties, according to one embodiment. For example, the data acquisition module 114 requests and receives from the third party computing environments 150 to supply or supplement the financial transaction data 122, according to one embodiment. In one embodiment, the third party computing environment 140 is configured to automatically transmit financial data to the financial management system 111 (e.g., to the data acquisition module 114), to be merged into the financial transaction data 122. The third party computing environment 140 can include, but is not limited to, financial service providers, state institutions, federal institutions, private employers, financial institutions, social media, and any other business, organization, or association that has maintained financial data, that currently maintains financial data, or which may in the future maintain financial data, according to one embodiment.

In one embodiment, the data acquisition module 114 acquires the financial transaction data 122 by executing instructions, processes, and/or scripts under the control of a script engine 116. The script engine 116 includes script data 130 related to a plurality of instructions, processes, and/or scripts to be executed by the data acquisition module 114 in order to obtain and organize the financial transaction data 122. The script data 130 can include data related to instructions, processes, and/or scripts that determine the frequency with which the data acquisition module 114 acquires financial transaction data 122, the time or times of day at which the data acquisition module 114 acquires additional financial transaction data 122, the login procedures the data acquisition module 114 uses when accessing financial transaction data 122 from third party computing environments 150, and other scripts related to the way the data acquisition module 114 obtains financial transaction data 122.

In one embodiment, the script engine 116 executes one or more scripts that direct the data acquisition module 114 to collect financial transaction data 122 from the website of a financial institution, e.g. a bank, a credit card company, etc. The user may have multiple financial accounts with a single financial institution. Thus, the script data 130 causes the data acquisition module 114 to access the website of the financial institution and acquire financial transaction data 122 related to each of the financial accounts that the user has with the financial institution. In an example in which the user has three financial accounts with the financial institution, the script data 130 causes the data acquisition module 114 to obtain first financial account data 123 related to financial transactions of the first financial account of the user, second financial account data 124 related to financial transactions of the second financial account of the user, and third financial account data 125 related to financial transactions of the third financial account of the user. Thus, the financial transaction data 122 includes the first financial account data 123, the second financial account data 124, and the third financial account data 125. The user interface module 112 outputs the financial transaction data 122 to the user computing environment 140. The user can receive the financial transaction data 122 and can see the overall state of each of the financial accounts as well as the individual financial transactions for each of the individual financial accounts.

It is possible for errors or deficiencies to occur in the script data 130. These errors or deficiencies can cause the data acquisition module 114 to fail to properly acquire the financial transaction data 122. In some cases, it is possible that the script engine 116 will cause the data acquisition module 114 to suddenly begin assigning to one of the financial accounts of the user, financial transactions that in fact occurred in another financial account of the user. This can occur for a variety of reasons. Most commonly, a change in the website of the financial institution causes the script data 130 to improperly collect and assign the financial transaction data 122. For example, in the past the website of the financial institution may have listed the first financial account first and the second financial account second. However, one day the financial institution updates its website and begins listing the second financial account first and the first financial account second. In this case the data acquisition module 114 obtains data from a position on the website that was previously associated with the first financial account but is now associated with the second financial account. The data acquisition module 114 may obtain financial transaction data 122 and assign to the first financial account data 123 financial transactions that in fact occurred in the second financial account. If this problem is not quickly detected and corrected, the user may receive erroneous financial transaction data 122 from the financial management system 111. This can cause the user to have an incorrect understanding of her financial situation.

The swapping of financial accounts as described above will affect the distribution characteristics of the financial transactions in the first financial account data 123 and the second financial account data 124. This is because the series of financial transactions in the first financial account will have particular characteristics including the types of financial transactions, the frequency of financial transactions, parties to the financial transactions, typical amounts of money associated with the financial transactions, geographic areas where financial transactions take place, and many other types of characteristics that can characterize a distribution of the financial transactions in a financial account. Thus, if an account swap happens as described above, there will be a sudden change in the characteristic distribution of the financial transactions. The financial transactions that happened after the account swap will not have the same characteristic distribution as the financial transactions that happened before the account swap. Likewise, the financial transactions in the second account will have a different characteristic distribution before the account swap and after the account swap.

In one embodiment, the financial management system 111 uses the analytics module 115 to analyze the transaction data 122 in order to detect when an account swap has occurred and to correct the account swap. In particular, the analytics module 115 analyzes the financial transaction data 122 to detect change points within the first financial account data 123, the second financial count data 124, and a third financial account data 125, in an example in which there are three financial accounts of the user associated with a same financial institution. The change points correspond to those points in time when the characteristic distribution of the financial account data suddenly changes. Thus, the analytics module 115 performs change point analysis to detect change points within the financial transaction data 122. The analytics module 115 can detect that an account swap has happened if two financial accounts have change points that occurred at approximately the same time and if swapping the financial transactions that happened after the change points causes the change points to disappear.

In one embodiment, the analytics module 115 analyzes the financial transaction data 122, and, for each financial account of the user, generates distribution data 126. The distribution data 126 indicates the characteristic distribution of the financial data in each of the financial accounts. For example, the distribution data 126 indicates the characteristic distribution of the first financial account, the characteristic distribution of the second financial account, and the characteristic distribution of the third financial account. The characteristic distribution describes a general characteristic of the financial transactions that collectively occur within the financial accounts.

Many financial accounts have regular events that are generally periodic or have a consistent distribution in terms of time gaps between the events or transactions. This can be particularly true for financial transactions. Typically there may be minor deviations from these distribution patterns. However, significant changes in the characteristic distribution across multiple financial accounts of the user at the same time may be an indication that an account swap has occurred.

In one embodiment, the analytics module 116 generates change point data 127 based on the distribution data 126. The change point data indicates one or more change points that have occurred in the financial accounts of the user. A change point indicates a time after which the characteristic distribution of financial transactions in a financial account has a sudden large-scale change.

In one embodiment, the analytics module 116 analyzes the change point data 127 to detect whether multiple financial accounts of the user have experienced change points that correlate in time with each other. If the change points correlate in time, then the analytics module 115 can undertake further analysis to detect if an account swap is the cause of the change points.

In one embodiment, the analytics module 115 determines whether an account swap has happened by generating adjusted financial transaction data 128. The adjusted financial transaction data 128 is generated by adjusting the financial transaction data 122 by swapping between the financial accounts those financial transactions that occurred after the change point. For example, if the first financial account and the second financial account have change points that correlate in time with each other, then the analytics module 115 generates adjusted financial transaction data 128 by swapping financial transactions that occurred after the change point from the first financial account to the second financial account and by swapping post-change point financial transactions from the second financial account to the second financial account. The analytics module 115 then analyzes the adjusted financial transaction data 128 to determine if the change points still exist within the first financial account data and the second financial account data. If the change points disappear for both the first financial count data 123 and the second financial account data 124, then the analytics module 115 determines that the cause of the change points was an account swap between the first and second financial accounts.

In one embodiment, the analytics module 115 updates the financial transaction data 122 in accordance with the adjusted financial transaction data 128. Thus, when the user interface module 112 provides the financial transaction data 122 to the user, the financial transaction data 122 includes the corrected first financial account data 123 and the corrected second financial account data 124. The analytics module 115 causes the script engine 116 to update the script data 130 so that the script engine 116 causes the data acquisition module 114 to properly obtain the financial transactions related to the first financial account and the second financial account.

It is possible that three or more financial accounts of the user can experience an account swap. For example, transactions from the first financial account may become associated with the second financial account, transactions from the second financial account may become associated with the third financial account, and transactions from the third financial account may become associated with the first financial account. In this case, the analytics module 115 analyzes the first financial account data 123, the second financial count data 124, and the third financial account data 125 and finds that each of the three financial accounts experienced change points that correlate together in time. The analytics module 115 first swaps the post change point financial transactions from the first financial account into the second financial account, the post change point financial transactions from the second financial account into the third financial account, and the post change point financial transactions from the third financial account into the first financial account. The analytics module 115 then performs change point analysis on the three financial accounts and finds that a change point still exists. The analytics module 115 then tries a different iteration and swaps the post change point financial transactions from the first financial account into the third financial account, the post change point financial transactions from the second financial account into the first financial account, and the post change point financial transactions from the third financial account into the second financial account. The analytics module then performs change point analysis on the first financial account data 123, the second financial account data 124, and third financial account data 125 and finds that the change points no longer exist. The analytics module 115 determines that the financial transactions from the first financial account had erroneously been associated with the second financial account, that the financial transactions from the second financial account had erroneously been associated with the third financial account, and that the financial transactions from the third financial account had been erroneously associated with the first financial account. In this way, the analytics module 115 can generate adjusted financial transaction data 128 for each possible permutation of account swapping until all accounts swapping has been resolved. The analytics module 115 can then update the script data 130 appropriately.

In one example, a user of the financial management system 111 has a business checking account and a personal checking account with a particular bank. The user provides account data 121 to the financial management system 111 that enables the financial management system 111 to log into the bank's website and to obtain financial transactions related to the personal checking account and the business checking account. The financial management system 111 includes script data 130 related to one or more scripts specifically tailored to the bank's website and the user's bank accounts. The one or more scripts cause the data acquisition module 114 to gather financial transaction data related to the personal checking account and the business checking account. The financial management system 111 provides financial transaction data 122 that indicates the financial state and the financial transactions of the personal checking account and the business checking account. The financial transaction data 122 can also include financial transaction data related to many other financial accounts that the user has with other financial institutions. The analytics module 115 periodically generates distribution data 126 that indicates the characteristic distribution of the financial transactions in both the personal checking account and the business checking account. Because the user uses the personal checking account and the business checking account in different ways, the personal checking account and the business checking account have different characteristic distributions. For example, the personal checking account has many more financial transactions per month than the business checking account. This is because the user uses the personal checking account to pay his mortgage, student loans, credit card bills, fees for his children's activities, and many other typical day today financial transactions. On the other hand, the business checking account has relatively few financial transactions per month. The business checking account typically has transactions related to infrequent business expenses such as buying office supplies, paying for Internet service, and a few other typical business expenses.

After many months of successfully obtaining financial transaction data, one day the analytics module 115 analyzes the distribution data 126 detects a change point in the characteristic distribution of both the personal checking account in the business checking account. The change points both occurred on March 15. Because the change points for both accounts occurred on March 15, the analytics module 115 determines that an account swap has possibly occurred. The analytics module 115 generates adjusted financial transaction data 128 by switching between the two accounts those transactions that occurred after the change points. In particular, the analytics module 115 swaps the financial transactions that occurred after March 15 between the two accounts. Transactions from the personal checking account that occurred after March 15 are exported into the business checking account. Transactions from the business checking account that occurred after March 15 are exported into the personal checking account. The analytics module 115 then generates distribution data 126 for the adjusted financial transaction data 128 and performs change point analysis on the distribution data 126. The analytics module 115 finds that the change points have disappeared in the adjusted financial transaction data 128. The analytics module 115 determines that an account swap had taken place on March 15 and adjusts the script data 130 to correct the account swap.

In a different example, the user may also have a personal savings account and a business savings account with the bank. The analytics module 115 generates distribution data 126 and change point data 127 four all four of the accounts of the user and finds that each experienced a change point on March 15. The analytics module 115 generates successive iterations of adjusted financial transaction data 128 that take financial transactions from each account and exports them to a different account. The analytics module 115 generates all permutations of adjusted financial transaction data 128 and analyzes them until the analytics module 115 finds the permutation the causes a change point of disappearing each account. The analytics module 115 causes the script engine 116 to update the script data 130 to correct the accounts swaps.

In one embodiment, the analytics module 115 generates the distribution data 126 by using one or more algorithms. The algorithms can include change point analysis or other types of algorithms that can identify the characteristic distribution of financial transactions in the financial accounts.

Embodiments of the present disclosure address some of the shortcomings associated with traditional financial management systems that do not adequately detect and address accounts swaps. A financial management system in accordance with one or more embodiments provides more reliable financial management services by dynamically detecting and addressing accounts swaps in financial accounts. The various embodiments of the disclosure can be implemented to improve the technical fields of user experience, services marketing, data collection, and data processing. Therefore, the various described embodiments of the disclosure and their associated benefits amount to significantly more than an abstract idea. In particular, by detecting and addressing accounts swaps in the financial management system, users of the financial management systems can save money and time and can better manage their finances.

Process

Figure 2:
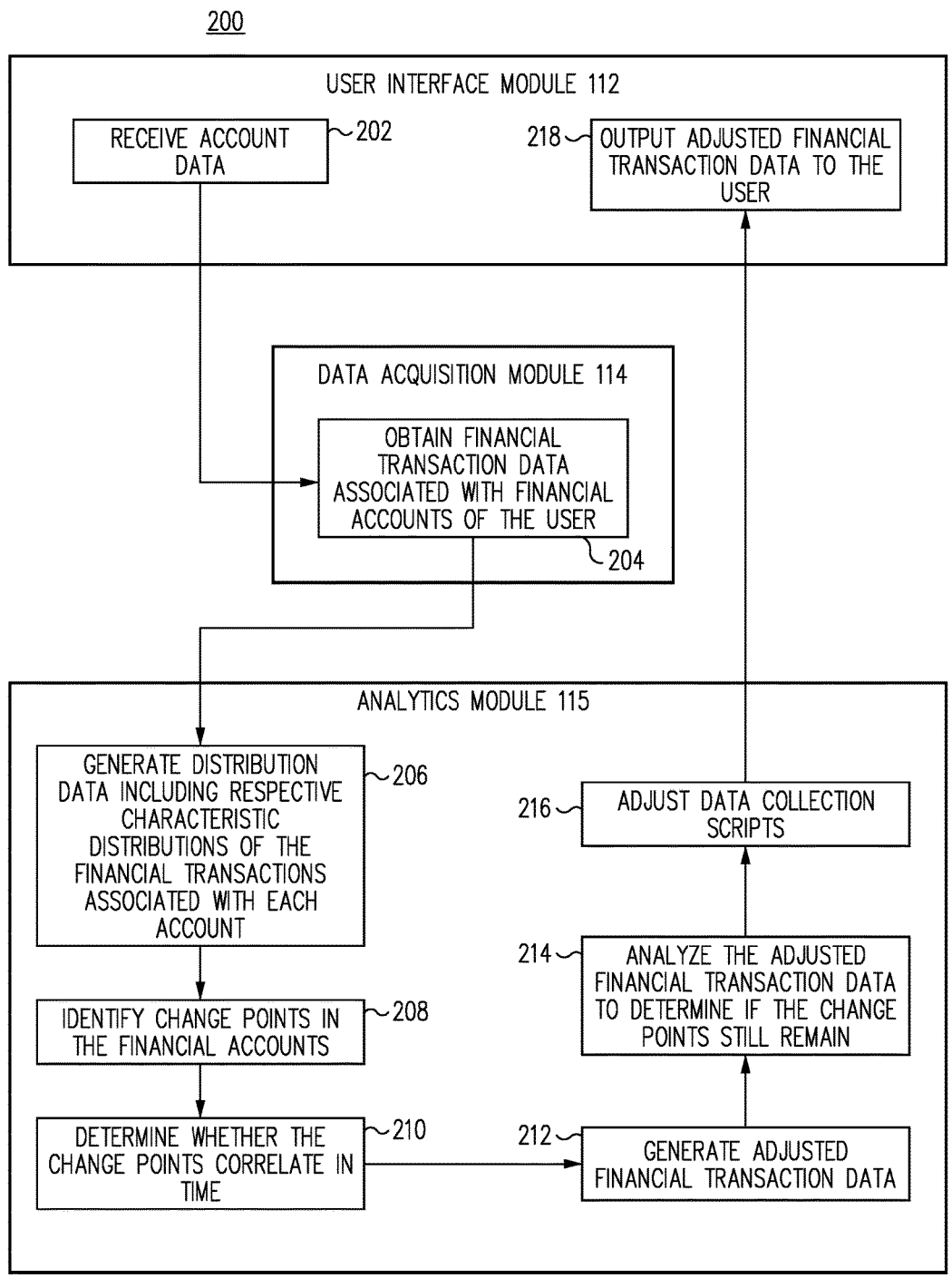
FIG. 2 is a block diagram of a process for detecting and addressing accounts swaps in a financial management system, in accordance with one embodiment.

FIG. 2 illustrates a functional flow diagram of a process 200 for detecting and addressing accounts swaps in a financial management system, in accordance with one embodiment.

At block 202 the user interface module 112 receives account data that provides access to a plurality of financial accounts of a user, according to one embodiment. From block 202 the process proceeds to block 204.

At block 204 the data acquisition module 114 obtains financial transaction data including financial transactions associated with the financial accounts of the user, according to one embodiment. From block 204 the process proceeds to block 206.

At block 206, the analytics module 115 generates distribution data including respective characteristic distributions of the financial transactions for each financial account, according to one embodiment. From block 206 the process proceeds to block 208.

At block 208 the analytics module 115 identifies change points in the financial accounts by performing change point analysis, according to one embodiment. From block 208 the process proceeds to block 210.

At block 210, the analytics module 115 determines whether the change points correlate in time with each other, according to one embodiment. From block 210 the process proceeds to block 212.

At block 212 the analytics module 115 generates adjusted financial transaction data by swapping between the financial accounts those financial transactions that occurred after the change points, according to one embodiment. From block 212 the process proceeds to block 214.

At block 214 the analytics module 115 analyzes the adjusted financial transaction data to determine if the change points still remain, according to one embodiment. If the change points no longer remain, the analytics module 115 determines that the change points were results of an account swap between the financial accounts, according to one embodiment. From block 214 the process proceeds to block 216.

At block 216 the analytics module 115 adjusts the data collection scripts to address the accounts swaps to ensure that future financial transactions are associated with the correct financial account in the financial transaction data, according to one embodiment. From block 216 the process proceeds to block 218.

At block 218 the user interface module 112 outputs the adjusted financial transaction data to the user, according to one embodiment.

Although a particular sequence is described herein for the execution of the process 200, other sequences can also be implemented.

Figure 3:
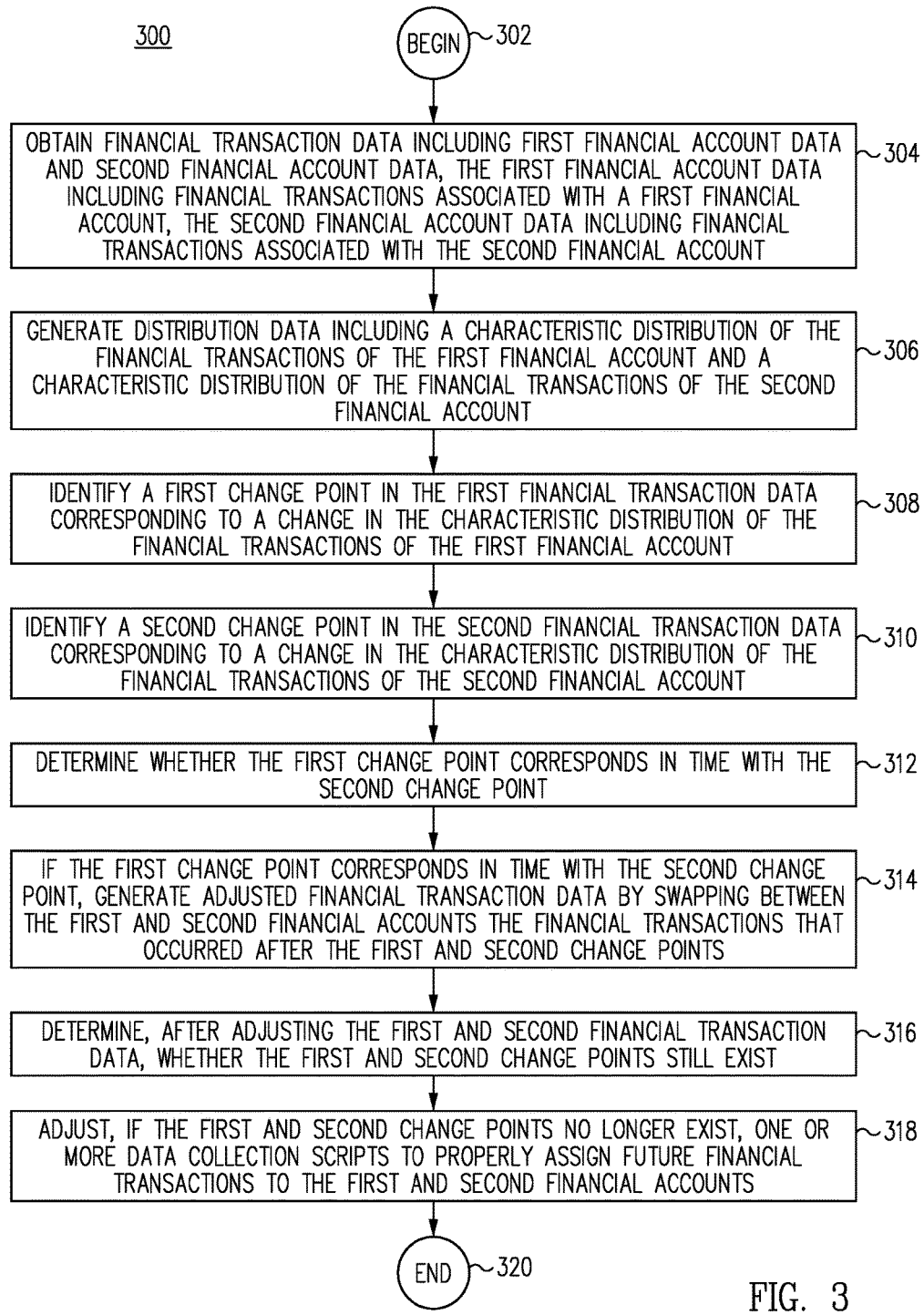
FIG. 3 is a flow diagram of a process for detecting and addressing accounts swaps in a financial management system, in accordance with one embodiment.

FIG. 3 illustrates a flow diagram of a process 300 for detecting and addressing accounts swaps in a financial management system, according to various embodiments.

In one embodiment, process 300 for detecting and addressing accounts swaps in a financial management system begins at BEGIN 302 and process flow proceeds to OBTAIN FINANCIAL TRANSACTION DATA INCLUDING FIRST FINANCIAL ACCOUNT DATA AND SECOND FINANCIAL ACCOUNT DATA, THE FIRST FINANCIAL ACCOUNT DATA INCLUDING FINANCIAL TRANSACTIONS ASSOCIATED WITH A FIRST FINANCIAL ACCOUNT, THE SECOND FINANCIAL ACCOUNT DATA INCLUDING FINANCIAL TRANSACTIONS ASSOCIATED WITH THE SECOND FINANCIAL ACCOUNT 304.

In one embodiment, at OBTAIN FINANCIAL TRANSACTION DATA INCLUDING FIRST FINANCIAL ACCOUNT DATA AND SECOND FINANCIAL ACCOUNT DATA, THE FIRST FINANCIAL ACCOUNT DATA INCLUDING FINANCIAL TRANSACTIONS ASSOCIATED WITH A FIRST FINANCIAL ACCOUNT, THE SECOND FINANCIAL ACCOUNT DATA INCLUDING FINANCIAL TRANSACTIONS ASSOCIATED WITH THE SECOND FINANCIAL ACCOUNT 304, process 300 for detecting and addressing accounts swaps in a financial management system obtains financial transaction data including first financial account data and second financial account data, the first financial account data including financial transactions associated with a first financial account, the second financial account data including financial transactions associated with the second financial account.

In one embodiment, once process 300 for detecting and addressing accounts swaps in a financial management system obtains financial transaction data including first financial account data and second financial account data, the first financial account data including financial transactions associated with a first financial account, the second financial account data including financial transactions associated with the second financial account at OBTAIN FINANCIAL TRANSACTION DATA INCLUDING FIRST FINANCIAL ACCOUNT DATA AND SECOND FINANCIAL ACCOUNT DATA, THE FIRST FINANCIAL ACCOUNT DATA INCLUDING FINANCIAL TRANSACTIONS ASSOCIATED WITH A FIRST FINANCIAL ACCOUNT, THE SECOND FINANCIAL ACCOUNT DATA INCLUDING FINANCIAL TRANSACTIONS ASSOCIATED WITH THE SECOND FINANCIAL ACCOUNT 304 process flow proceeds to GENERATE DISTRIBUTION DATA INCLUDING A CHARACTERISTIC DISTRIBUTION OF THE FINANCIAL TRANSACTIONS OF THE FIRST FINANCIAL ACCOUNT AND A CHARACTERISTIC DISTRIBUTION OF THE FINANCIAL TRANSACTIONS OF THE SECOND FINANCIAL ACCOUNT 306.

In one embodiment, at GENERATE DISTRIBUTION DATA INCLUDING A CHARACTERISTIC DISTRIBUTION OF THE FINANCIAL TRANSACTIONS OF THE FIRST FINANCIAL ACCOUNT AND A CHARACTERISTIC DISTRIBUTION OF THE FINANCIAL TRANSACTIONS OF THE SECOND FINANCIAL ACCOUNT 306, process 300 for detecting and addressing accounts swaps in a financial management system generates distribution data including a characteristic distribution of the financial transactions of the first financial account and a characteristic distribution of the financial transactions of the second financial account.

In one embodiment, once process 300 for detecting and addressing accounts swaps in a financial management system generates distribution data including a characteristic distribution of the financial transactions of the first financial account and a characteristic distribution of the financial transactions of the second financial account at GENERATE DISTRIBUTION DATA INCLUDING A CHARACTERISTIC DISTRIBUTION OF THE FINANCIAL TRANSACTIONS OF THE FIRST FINANCIAL ACCOUNT AND A CHARACTERISTIC DISTRIBUTION OF THE FINANCIAL TRANSACTIONS OF THE SECOND FINANCIAL ACCOUNT 306, process flow proceeds to IDENTIFY A FIRST CHANGE POINT IN THE FIRST FINANCIAL TRANSACTION DATA CORRESPONDING TO A CHANGE IN THE CHARACTERISTIC DISTRIBUTION OF THE FINANCIAL TRANSACTIONS OF THE FIRST FINANCIAL ACCOUNT 308.

In one embodiment, at IDENTIFY A FIRST CHANGE POINT IN THE FIRST FINANCIAL TRANSACTION DATA CORRESPONDING TO A CHANGE IN THE CHARACTERISTIC DISTRIBUTION OF THE FINANCIAL TRANSACTIONS OF THE FIRST FINANCIAL ACCOUNT 308, process 300 for detecting and addressing accounts swaps in a financial management system identifies a first change point in the first financial transaction data corresponding to a change in the characteristic distribution of the financial transactions of the first financial account, according to one embodiment.

In one embodiment, once process 300 for detecting and addressing accounts swaps in a financial management system identifies a first change point in the first financial transaction data corresponding to a change in the characteristic distribution of the financial transactions of the first financial account at IDENTIFY A FIRST CHANGE POINT IN THE FIRST FINANCIAL TRANSACTION DATA CORRESPONDING TO A CHANGE IN THE CHARACTERISTIC DISTRIBUTION OF THE FINANCIAL TRANSACTIONS OF THE FIRST FINANCIAL ACCOUNT 308, process flow proceeds to IDENTIFY A SECOND CHANGE POINT IN THE SECOND FINANCIAL TRANSACTION DATA CORRESPONDING TO A CHANGE IN THE CHARACTERISTIC DISTRIBUTION OF THE FINANCIAL TRANSACTIONS OF THE SECOND FINANCIAL ACCOUNT 310.

In one embodiment, at IDENTIFY A SECOND CHANGE POINT IN THE SECOND FINANCIAL TRANSACTION DATA CORRESPONDING TO A CHANGE IN THE CHARACTERISTIC DISTRIBUTION OF THE FINANCIAL TRANSACTIONS OF THE SECOND FINANCIAL ACCOUNT 310 the process 300 identifies a second change point in the second financial transaction data corresponding to a change in the characteristic distribution of the financial transactions of the second financial account.

In one embodiment, once process 300 identifies a second change point in the second financial transaction data corresponding to a change in the characteristic distribution of the financial transactions of the second financial account at IDENTIFY A SECOND CHANGE POINT IN THE SECOND FINANCIAL TRANSACTION DATA CORRESPONDING TO A CHANGE IN THE CHARACTERISTIC DISTRIBUTION OF THE FINANCIAL TRANSACTIONS OF THE SECOND FINANCIAL ACCOUNT 310, process flow proceeds to DETERMINE WHETHER THE FIRST CHANGE POINT CORRESPONDS IN TIME WITH THE SECOND CHANGE POINT 312.

In one embodiment, at DETERMINE WHETHER THE FIRST CHANGE POINT CORRESPONDS IN TIME WITH THE SECOND CHANGE POINT 312 the process 300 for detecting and addressing accounts swaps in a financial management system determines whether the first change point corresponds in time with the second change point.

In one embodiment, once the process 300 for detecting and addressing accounts swaps in a financial management system determines whether the first change point corresponds in time with the second change point at DETERMINE WHETHER THE FIRST CHANGE POINT CORRESPONDS IN TIME WITH THE SECOND CHANGE POINT 312, process flow proceeds to IF THE FIRST CHANGE POINT CORRESPONDS IN TIME WITH THE SECOND CHANGE POINT, GENERATE ADJUSTED FINANCIAL TRANSACTION DATA BY SWAPPING BETWEEN THE FIRST AND SECOND FINANCIAL ACCOUNTS THE FINANCIAL TRANSACTIONS THAT OCCURRED AFTER THE FIRST AND SECOND CHANGE POINTS 314.

In one embodiment, at IF THE FIRST CHANGE POINT CORRESPONDS IN TIME WITH THE SECOND CHANGE POINT, GENERATE ADJUSTED FINANCIAL TRANSACTION DATA BY SWAPPING BETWEEN THE FIRST AND SECOND FINANCIAL ACCOUNTS THE FINANCIAL TRANSACTIONS THAT OCCURRED AFTER THE FIRST AND SECOND CHANGE POINTS 314 the process 300 for detecting and addressing accounts swaps in a financial management system if the first change point corresponds in time with the second change point, generates adjusted financial transaction data by swapping between the first and second financial accounts the financial transactions that occurred after the first and second change points.

In one embodiment, once the process 300 for detecting and addressing accounts swaps in a financial management system if the first change point corresponds in time with the second change point, generates adjusted financial transaction data by swapping between the first and second financial accounts the financial transactions that occurred after the first and second change points at IF THE FIRST CHANGE POINT CORRESPONDS IN TIME WITH THE SECOND CHANGE POINT, GENERATE ADJUSTED FINANCIAL TRANSACTION DATA BY SWAPPING BETWEEN THE FIRST AND SECOND FINANCIAL ACCOUNTS THE FINANCIAL TRANSACTIONS THAT OCCURRED AFTER THE FIRST AND SECOND CHANGE POINTS 314, process flow proceeds to DETERMINE, AFTER ADJUSTING THE FIRST AND SECOND FINANCIAL TRANSACTION DATA, WHETHER THE FIRST AND SECOND CHANGE POINTS STILL EXIST 316.

In one embodiment, at DETERMINE, AFTER ADJUSTING THE FIRST AND SECOND FINANCIAL TRANSACTION DATA, WHETHER THE FIRST AND SECOND CHANGE POINTS STILL EXIST 316, the process 300 for detecting and addressing accounts swaps in a financial management system determines, after adjusting the first and second financial transaction data, whether the first and second change points still exist.

In one embodiment, once the process 300 for detecting and addressing accounts swaps in a financial management system determines, after adjusting the first and second financial transaction data, whether the first and second change points still exist at DETERMINE, AFTER ADJUSTING THE FIRST AND SECOND FINANCIAL TRANSACTION DATA, WHETHER THE FIRST AND SECOND CHANGE POINTS STILL EXIST 316 proceeds to ADJUST, IF THE FIRST AND SECOND CHANGE POINTS NO LONGER EXIST, ONE OR MORE DATA COLLECTION SCRIPTS TO PROPERLY ASSIGN FUTURE FINANCIAL TRANSACTIONS TO THE FIRST AND SECOND FINANCIAL ACCOUNTS 318.

In one embodiment, at ADJUST, IF THE FIRST AND SECOND CHANGE POINTS NO LONGER EXIST, ONE OR MORE DATA COLLECTION SCRIPTS TO PROPERLY ASSIGN FUTURE FINANCIAL TRANSACTIONS TO THE FIRST AND SECOND FINANCIAL ACCOUNTS 318 the process 300 for detecting and addressing accounts swaps in a financial management system adjusts, if the first and second change points no longer exist, one or more data collection scripts to properly assign future financial transactions to the first and second financial accounts.

In one embodiment, once the process 300 for detecting and addressing accounts swaps in a financial management system adjusts, if the first and second change points no longer exist, one or more data collection scripts to properly assign future financial transactions to the first and second financial accounts at ADJUST, IF THE FIRST AND SECOND CHANGE POINTS NO LONGER EXIST, ONE OR MORE DATA COLLECTION SCRIPTS TO PROPERLY ASSIGN FUTURE FINANCIAL TRANSACTIONS TO THE FIRST AND SECOND FINANCIAL ACCOUNTS 318, process flow proceeds to END 320.

In one embodiment, at END 320 the process for detecting and addressing accounts swaps in a financial management system is exited to await new data and/or instructions.

As noted above, the specific illustrative examples discussed above are but illustrative examples of implementations of embodiments of the method or process for detecting and addressing accounts swaps in a financial management system. Those of skill in the art will readily recognize that other implementations and embodiments are possible. Therefore, the discussion above should not be construed as a limitation on the claims provided below.

As noted above, the specific illustrative examples discussed above are but illustrative examples of implementations of embodiments of the method or process for detecting and addressing accounts swaps in a financial management system. Those of skill in the art will readily recognize that other implementations and embodiments are possible. Therefore, the discussion above should not be construed as a limitation on the claims provided below.

In one embodiment, a computing system implemented method detects and addresses accounts swaps in a financial management system. The method includes obtaining financial transaction data including first financial account data and second financial account data. The first financial account data includes financial transactions associated with a first financial account. The second financial account data includes financial transactions associated with the second financial account. The method further includes generating distribution data including a characteristic distribution of the financial transactions of the first financial account and a characteristic distribution of the financial transactions of the second financial account, identifying a first change point in the first financial transaction data corresponding to a change in the characteristic distribution of the financial transactions of the first financial account, and identifying a second change point in the second financial transaction data corresponding to a change in the characteristic distribution of the financial transactions of the second financial account. The method further includes determining whether the first change point corresponds in time with the second change point, if the first change point corresponds in time with the second change point, generating adjusted financial transaction data by swapping between the first and second financial accounts the financial transactions that occurred after the first and second change points, and determining, after adjusting the first and second financial transaction data, whether the first and second change points still exist. The method further includes adjusting, if the first and second change points no longer exist, one or more data collection scripts to properly assign future financial transactions to the first and second financial accounts.

In one embodiment, a non-transitory computer-readable medium has a plurality of computer-executable instructions which, when executed by a processor, perform a method for detecting and addressing accounts swaps in a financial management system. The instructions include a user interface module configured receive account data related to a plurality of financial accounts of the user and a script engine including script data defining one or more scripts for obtaining financial transaction data from the plurality of financial accounts. The instructions further include an information acquisition module configured to obtain, in accordance with the script data, financial transaction data including financial transactions associated with each of the plurality of financial accounts. The instructions further include an analytics module configured to generate distribution data including a respective characteristic distribution of financial transactions for each financial account and to generate change point data including a respective change point for each financial account. Each change point corresponds to a time after which the characteristic distribution of the respective financial account changes. The analytics module is further configured to determine if the change points correlate in time, and, if the change points correlate in time, to generate adjusted financial transaction data by swapping financial transactions that occurred after the change points between the financial accounts until the change points disappear. The analytics module is further configured to adjust the script data in accordance with the adjusted financial transaction data to cause the one or more scripts to properly associate future financial transactions with the respective financial accounts.

In one embodiment, a system for detecting and addressing accounts swaps in a financial management system includes at least one processor and at least one memory coupled to the at least one processor. The at least one memory has stored therein instructions which, when executed by any set of the one or more processors, perform a process. The process includes obtaining, with a data acquisition module of a computing system, financial transaction data including first financial account data and second financial account data. The first financial account data includes financial transactions associated with a first financial account. The second financial account data including financial transactions associated with the second financial account. The process further includes generating, with an analytics module of a computing system, distribution data including a characteristic distribution of the financial transactions of the first financial account and a characteristic distribution of the financial transactions of the second financial account, identifying, with the analytics module, a first change point in the first financial transaction data corresponding to a change in the characteristic distribution of the financial transactions of the first financial account, and identifying, with the analytics module, a second change point in the second financial transaction data corresponding to a change in the characteristic distribution of the financial transactions of the second financial account. The process further includes determining, with the analytics module, whether the first change point corresponds in time with the second change point, if the first change point corresponds in time with the second change point, generating, with the analytics module, adjusted financial transaction data by swapping between the first and second financial accounts the financial transactions that occurred after the first and second change points, determining, with the analytics module, and after adjusting the first and second financial transaction data, whether the first and second change points still exist, and adjusting, with the analytics module, and if the first and second change points no longer exist, one or more data collection scripts to properly assign future financial transactions to the first and second financial accounts.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for detecting and addressing accounts swaps in a financial management system, the method comprising:

obtaining financial transaction data including first financial account data and second financial account data, the first financial account data including financial transactions associated with a first financial account, the second financial account data including financial transactions associated with the second financial account;

generating, using first account financial transactions of the first account, first account distribution data including types of first account financial transactions, a frequency of first account financial transactions, parties to the first account financial transactions, amounts of money associated with the first account financial transactions and geographic areas where first account financial transactions have taken place;

generating, using second account financial transactions of the second account, second account distribution data including types of second account financial transactions, a frequency of second account financial transactions, parties to the second account financial transactions, amounts of money associated with the second account financial transactions and geographic areas where second account financial transactions have taken place;

identifying a first change point in the first financial transaction data corresponding to a change in one or more of the types of first account financial transactions, the frequency of first account financial transactions, the parties to the first account financial transactions, the amounts of money associated with the first account financial transactions and geographic areas where first account financial transactions have taken place;

identifying a second change point in the second financial transaction data corresponding to a change in one or more of the types of second account financial transactions, the frequency of second account financial transactions, the parties to the second account financial transactions, the amounts of money associated with the second account financial transactions and the geographic areas where second account financial transactions have taken place;

determining whether the first change point occurred at the same time as the time of the second change point;

generating, upon a determination that the first change point occurred at the same time as the time of the second change point, adjusted financial transaction data by swapping between the first and second financial accounts financial transactions that occurred after the first and second change points;

determining, after generating the adjusted financial transaction data, whether the first and second change points no longer exist; and adjusting, upon a determination that the first and second change points no longer exist, one or more data collection scripts to properly assign future financial transactions to the first and second financial accounts.

2. The method of claim 1, further including determining, upon a determination that the first and second change points no longer exist, that the one or more data collection scripts had been improperly assigning financial transactions from the first financial account to the second financial account and improperly assigning financial transactions from the second financial account to the first financial account.

3. The method of claim 2, wherein adjusting the one or more data collection scripts includes swapping respective financial account identifiers of the first and second financial accounts.

4. The method of claim 1, wherein identifying the first and second change points includes performing change point analysis on the first and second financial account data.

5. The method of claim 1, further comprising:
receiving account data from the user; and
accessing, with the account data, the first and second financial accounts at a website of a third party financial institution associated with the first and second financial accounts.

6. The method of claim 5, further comprising obtaining the first and second financial transaction data from the website.

7. The method of claim 6, wherein the first and second change points correspond to a change in format of the website.

8. The method of claim 5, wherein the account data includes login credentials of the user.

9. The method of claim 8, wherein the account data includes login data for a plurality of third party financial institutions.

10. The method of claim 9, wherein the account data includes one or more of:
a username;
a password;
a first name;
a last name;
a routing number;
an account number;
an identification number;
a name of a company;
an answer to a security question;
a social security number;
an email address; or
a birthdate.

11. The method of claim 1, wherein the financial transactions include one or more of:
banking transactions;
credit card transactions;
payment of bills;
retirement account activity;
investment activity;
loan activity;
interest accrual;
interest payments;
student loan payments;
mortgage payments;
rent payments; or
tax payments.

12. The method of claim 1, further comprising outputting the adjusted financial transaction data to the user.

13. The method of claim 1, wherein obtaining the financial transaction data includes obtaining financial account data of one or more additional accounts.

14. The method of claim 13, further comprising:
generating, for individual ones of one or more additional financial accounts of the user, using individual respective account financial transactions of the respective additional accounts, distribution data for each individual financial account, including types of respective additional account financial transactions, frequencies of financial transactions, parties to the financial transactions, amounts of money associated with the financial transactions, and geographic areas where financial transactions have taken place.

15. The method of claim 14, further comprising:
identifying one or more of the additional accounts having a change point occurring at the same time as the first change point;
swapping financial transactions that occurred after the first change point between the additional accounts in successive iterations and analyzing the financial transaction data for each iteration until each of the change points are removed; and
adjusting one more data collection scripts to properly assign future financial transactions to the first, second, and additional financial accounts.

16. A system for detecting and addressing accounts swaps in a financial management system, the system comprising:
at least one processor; and
at least one memory coupled to the at least one processor, the at least one memory having stored therein instructions which, when executed by the at least one processors, perform a process including:

obtaining, with a data acquisition module of a computing system, financial transaction data including first financial account data and second financial account data, the first financial account data including financial transactions associated with a first financial account, the second financial account data including financial transactions associated with the second financial account;

generating, with an analytics module of a computing system, using first account financial transactions of the first account, first account distribution data including types of first account financial transactions, a frequency of first account financial transactions, parties to the first account financial transactions, amounts of money associated with the first account financial transactions and geographic areas where first account financial transactions have taken place;

generating, using second account financial transactions of the second account, second account distribution data including types of second account financial transactions, a frequency of second account financial transactions, parties to the second account financial transactions, amounts of money associated with the second account financial transactions and geographic areas where second account financial transactions have taken place;

identifying, with the analytics module, a first change point in the first financial transaction data corresponding to a change in one or more of the types of first account financial transactions, the frequency of first account financial transactions, the parties to the first account financial transactions, the amounts of money associated with the first account financial transactions and geographic areas where first account financial transactions have taken place;

identifying, with the analytics module, a second change point in the second financial transaction data corresponding to a change in one or more of the types of second account financial transactions, the frequency of second account financial transactions, the parties to the second account financial transactions, the amounts of money associated with the second account financial transactions and the geographic areas where second account financial transactions have taken place;

determining, with the analytics module, whether the first change point occurred at the same time as the time of the second change point;

generating, with the analytics module, upon a determination that the first change point occurred at the same time as the time of the second change point, adjusted financial transaction data by swapping between the first and second financial accounts financial transactions that occurred after the first and second change points;

determining, with the analytics module, after generating the adjusted financial transaction data, whether the first and second change points no longer exist; and adjusting, with the analytics module, upon a determination that the and if the first and second change points no longer exist, one or more data collection scripts to properly assign future financial transactions to the first and second financial accounts.

17. The system of claim 16, wherein the process includes determining, upon a determination that the first and second change points no longer exist, that the one or more data collection scripts had been improperly assigning financial transactions from the first financial account to the second financial account and improperly assigning financial transactions from the second financial account to the first financial account.

18. The system of claim 17, wherein adjusting the one or more data collection scripts includes swapping respective financial account identifiers of the first and second financial accounts.

19. The system of claim 16, wherein identifying the first and second change points includes performing change point analysis on the first and second financial account data.

20. The system of claim 16, wherein the process includes:
receiving account data from the user; and
accessing, with the account data, the first and second financial accounts at a website of a third party financial institution associated with the first and second financial accounts.

21. The system of claim 20, wherein the process further includes obtaining the first and second financial transaction data from the website.

22. The system of claim 21, wherein the first and second change points correspond to a change in format of the website.

23. The system of claim 20, wherein the account data includes login credentials of the user.

24. The system of claim 23, wherein the account data includes login data for a plurality of third party financial institutions.

25. The system of claim 24, wherein the account data includes one or more of:
a username;
a password;
a first name;
a last name;
a routing number;
an account number;
an identification number;
a name of a company;
an answer to a security question;
a social security number;
an email address; or
a birthdate.

26. The system of claim 16, wherein the financial transactions include one or more of:
banking transactions;
credit card transactions;
payment of bills;
retirement account activity;
investment activity;
loan activity;
interest accrual;
interest payments;
student loan payments;
mortgage payments;
rent payments; or
tax payments.

27. The system of claim 16, wherein the process includes outputting the adjusted financial transaction data to the user.

* * * * *